US009558226B2

United States Patent
Baldwin et al.

(10) Patent No.: US 9,558,226 B2
(45) Date of Patent: Jan. 31, 2017

(54) STORAGE QUOTA MANAGEMENT (71) Applicant: International Business Machines Corporation, Armonk, NY (US)

(72) Inventors: Duane M. Baldwin, Mantorville, MN (US); John T. Olson, Tucson, AZ (US); Sandeep R. Patil, Pune (IN); Smita J. Raut, Pune (IN); Eran Rom, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 14/181,946

(22) Filed: Feb. 17, 2014

(65) Prior Publication Data

US 2015/0234879 A1 Aug. 20, 2015

(51) Int. Cl.
*G06F 17/30* (2006.01)

(52) U.S. Cl.
CPC .............. *G06F 17/30342* (2013.01)

(58) Field of Classification Search
None
See application file for complete search history.

(56) References Cited

U.S. PATENT DOCUMENTS

| | | | | |
|---|---|---|---|---|
| 6,832,248 | B1 * | 12/2004 | Byrnes | ............ H04L 29/06 707/999.001 |
| 7,783,666 | B1 | 8/2010 | Zhuge et al. | |
| 8,291,490 | B1 | 10/2012 | Ahmed et al. | |
| 8,402,051 | B2 | 3/2013 | Ryan et al. | |
| 2006/0041587 | A1 * | 2/2006 | Grubbs | ............ G06F 17/30067 |
| 2011/0302287 | A1 * | 12/2011 | Muppirala | ............ G06F 9/5077 709/223 |
| 2012/0150930 | A1 | 6/2012 | Jin et al. | |
| 2012/0185913 | A1 | 7/2012 | Martinez et al. | |
| 2012/0254116 | A1 | 10/2012 | Thereska et al. | |
| 2012/0263191 | A1 | 10/2012 | Baron | |
| 2013/0074091 | A1 | 3/2013 | Xavier et al. | |
| 2014/0052953 | A1 * | 2/2014 | Ben-Tsion | ............ G06F 3/0605 711/172 |
| 2015/0088646 | A1 * | 3/2015 | Mody | ............ G06Q 30/0255 705/14.53 |
| 2015/0199388 | A1 * | 7/2015 | Hrischuk | ............ G06F 17/30289 707/802 |

OTHER PUBLICATIONS

Brebner, P., et al., "Modeling Cloud Cost and Performance", Annual International Conference on Cloud Computing and Virtualization (CCV 2010). pp. 79-86. © CCV 2010 & GSTF. DOI: 10.5176/978-981-08-5837-7 154.

(Continued)

*Primary Examiner* — Anh Tai Tran
(74) *Attorney, Agent, or Firm* — Peter J. Edwards (57) ABSTRACT A method of and system for managing storage of an object for an object store is disclosed. The method and system may establish the object store. The object store may be configured to be used for a user for a workload-type for a set of objects. The method and system may provide, for the user for the workload-type, an object store quota. The method and system may provide, for the user for the workload-type, a meta-data quota. The method and system may process, consistent with both the object store quota and the meta-data quota, the set of objects.

6 Claims, 6 Drawing Sheets

(56) References Cited

OTHER PUBLICATIONS

Edlund, A., et al., "Practical Cloud Evaluation from a Nordic eScience User Perspective", VTDC '11, pp. 29-38. ACM. DOI: 10.1145/1996121.1996129.
Padmavathy, K.M., "CDMI Support to Object Storage in Cloud", 2012 Storage Developer Conference, Santa Clara, CA, 2012. Copyright Wipro Technologies Limited.
Unknown, "Customer Apps", Amazon Web Services, Inc., 2013. http://aws.amazon.com/customerapps/Amazon-S3?c=25&p=2&sm=dD.
Unknown, "Disk Quota", Wikipedia. Last modified on Aug. 13, 2013. http://en.wikipedia.org/wiki/Disk_quota.

\* cited by examiner

STORAGE QUOTA MANAGEMENT

BACKGROUND

This disclosure relates generally to computer systems and, more particularly, relates to storage quota management. The amount of data that needs to be managed by enterprises is growing at an extremely high rate. A disk quota is a protocol that is often used by system administrators to ensure that available storage resources are equitably and reasonably distributed among the users of the operating systems that are used by a network. Storage cloud services can assist in managing data. Object storage can assist in handling the high rate growth of unstructured data.

BRIEF SUMMARY

Aspects of the disclosure relate to storage quota management. A separate quota for user-defined metadata can be provided. Data and meta-data quotas may be provided both per user and per application. Aspects of the disclosure include a method of and system for managing storage of an object for an object store. The method and system may establish the object store. The object store may be configured to be used for a user for a workload-type for a set of objects. The method and system may provide, for the user for the workload-type, an object store quota. The method and system may provide, for the user for the workload-type, a meta-data quota. The method and system may process, consistent with both the object store quota and the meta-data quota, the set of objects.

Aspects of the disclosure may include changing, in response to a triggering event, a particular object store quota. Similarly, a particular meta-data quota may be changed in response to a triggering event. In embodiments, a future object store quota may be generated (e.g., predicted) for a particular user for a particular workload-type. Similarly, a future meta-data quota may be generated for a particular user for a particular workload-type. The generations may be based at least in part on historical data. In embodiments, the particular meta-data quota may be for user-defined meta-data. In embodiments, the particular meta-data quota may be for application-defined meta-data. In embodiments, the particular meta-data quota may be based on utilization of the particular workload-type running on the object store. In embodiments, the object may include a unique identifier, data, or meta-data. The meta-data may include user-defined meta-data having a tag corresponding to something (e.g., an image).

DETAILED DESCRIPTION

In a cloud storage environment where data is consolidated and storage resources are shared, storage quota management can be a part of cloud metering and billing. A quota can be enforced on an object store for a user or group. Workload based quotas may be enforced for users or groups, and also for user-defined meta-data associated with objects. Such quotas may positively impact management and control over application usage by a user or group. Storage administrators may manage storage effectively with minimal wastage of disk space, which may positively impact disk space allocation (or over-allocation) and positively impact overall storage cost. Aspects of the disclosure provide features to have object store quotas per user particularly associated with user/administrator approved/given workloads, provide features to have separate quotas for user-defined meta-data associated with objects per user particularly associated for user/administrator approved/given workloads, and provide features to generate future storage quota requirements for users per approved/given workloads.

Aspects of the disclosure include a system and method for managing storage of an object for an object store. The system and method include establishing the object store. The object store may be configured to be used for a first user for a first workload-type for a first set of objects. The system and method include providing (e.g., assigning), for the first user for the first workload-type, a first object store quota (e.g., a value). The system and method include providing (e.g., assigning), for the first user for the first workload-type, a first meta-data quota (e.g., a value). The system and method include processing the first set of objects. Processing the first set of objects may occur consistent with both the first object store quota and the first meta-data quota.

In embodiments, the first meta-data quota may be for user-defined meta-data. In embodiments, the first meta-data quota may be for application-defined meta-data. In embodiments, the first meta-data quota may be based on utilization of the first workload-type running on the object store. In embodiments, the object may include a unique identifier, data, or meta-data. The meta-data may include user-defined meta-data having a tag corresponding to something (e.g., an image).

Aspects of the disclosure may include configuring the object store to be used for a second user for the first workload-type for a second set of objects. A second object store quota may be provided for the second user for the first workload-type. A second meta-data quota may be provided for the second user for the first workload-type. The second set of objects may be processed consistent with both the second object store quota and the second meta-data quota.

Aspects of the disclosure may include configuring the object store to be used for the first user for a second workload-type for a third set of objects. A third object store quota may be provided for the first user for the second workload-type. A third meta-data quota may be provided for the first user for the second workload-type. The third set of objects may be processed consistent with both the third object store quota and the third meta-data quota.

Aspects of the disclosure may include changing, in response to a triggering event, a particular object store quota. Similarly, a particular meta-data quota may be changed in response to a triggering event. In embodiments, a future object store quota may be generated (e.g., predicted) for a particular user for a particular workload-type. Similarly, a future meta-data quota may be generated for a particular user for a particular workload-type. The generations may be based at least in part on historical data.

A disk quota is a protocol that is often used by system administrators to equitably and reasonably distribute available system resources among the users. There are two basic types of disk quotas. A usage quota (or block quota) limits the amount of disk space that can be used. A file quota (or inode quota) limits the number of files and directories that can be created. Disk quotas may be implemented on a per-user or per-group basis.

Object store is storage technology with future potential. It is storage that can be used in cloud environment. Object store may assist in handling the exponential growth of unstructured data. Object store may use data objects with a unique object identifier where each object contains its own meta-data along with actual data. Part of object meta-data can be user-defined metadata. The user-defined meta-data (tags) can represent a differentiator of object store storage and can be used extensively. For example, file sync and share applications can make use of object store behind the scenes. Similarly, persons (including businesses) can use data backup or archive features as an extended storage drive for project purposes.

In embodiments, meta-data (e.g., user-defined meta-data) can be stored separately on faster disks to help gain better object store performance. Such faster disks may be costlier and have availability constraints. Thus, judicious use of such faster disks may be useful. Aspects of the disclosure provide features allowing a quota to be associated for user-defined meta-data based on a workload running on an object store.

It is understood in advance that although this disclosure includes a detailed description regarding cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1A:
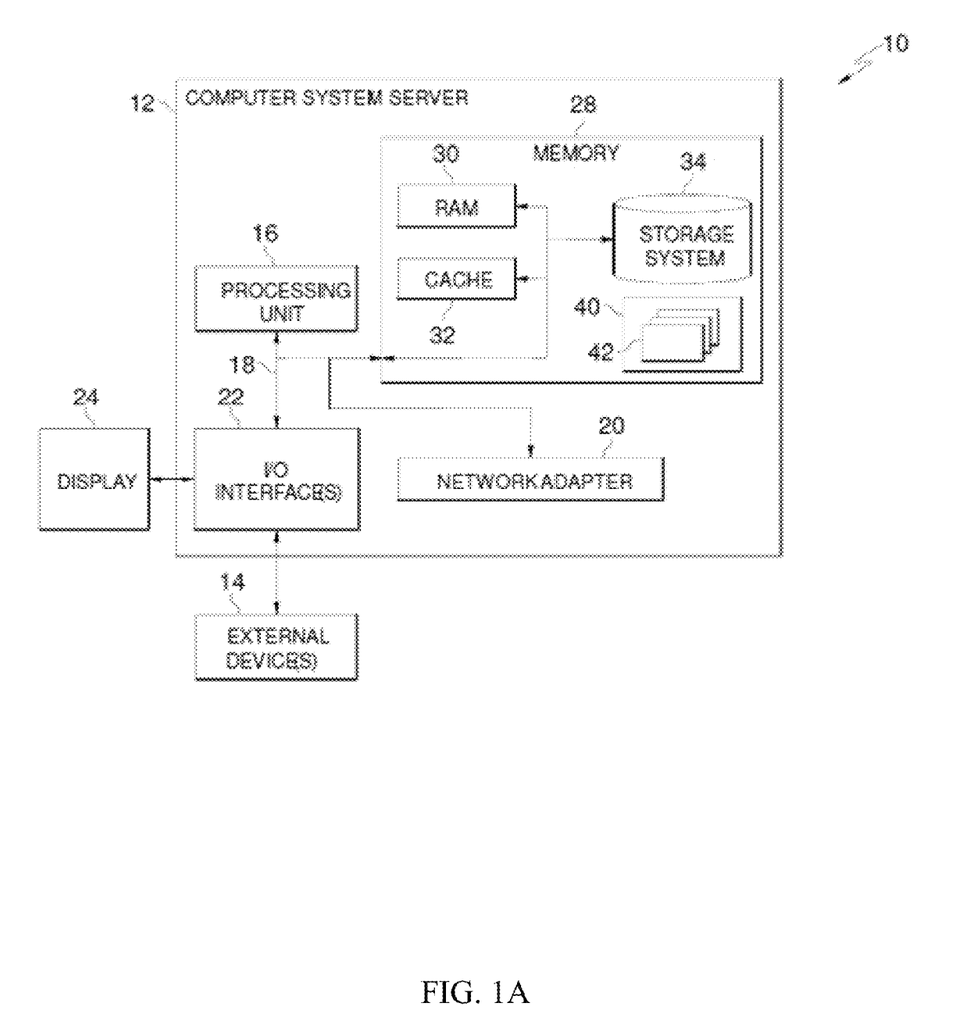
FIG. 1A depicts a cloud computing node according to embodiments.

Referring now to FIG. 1A, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
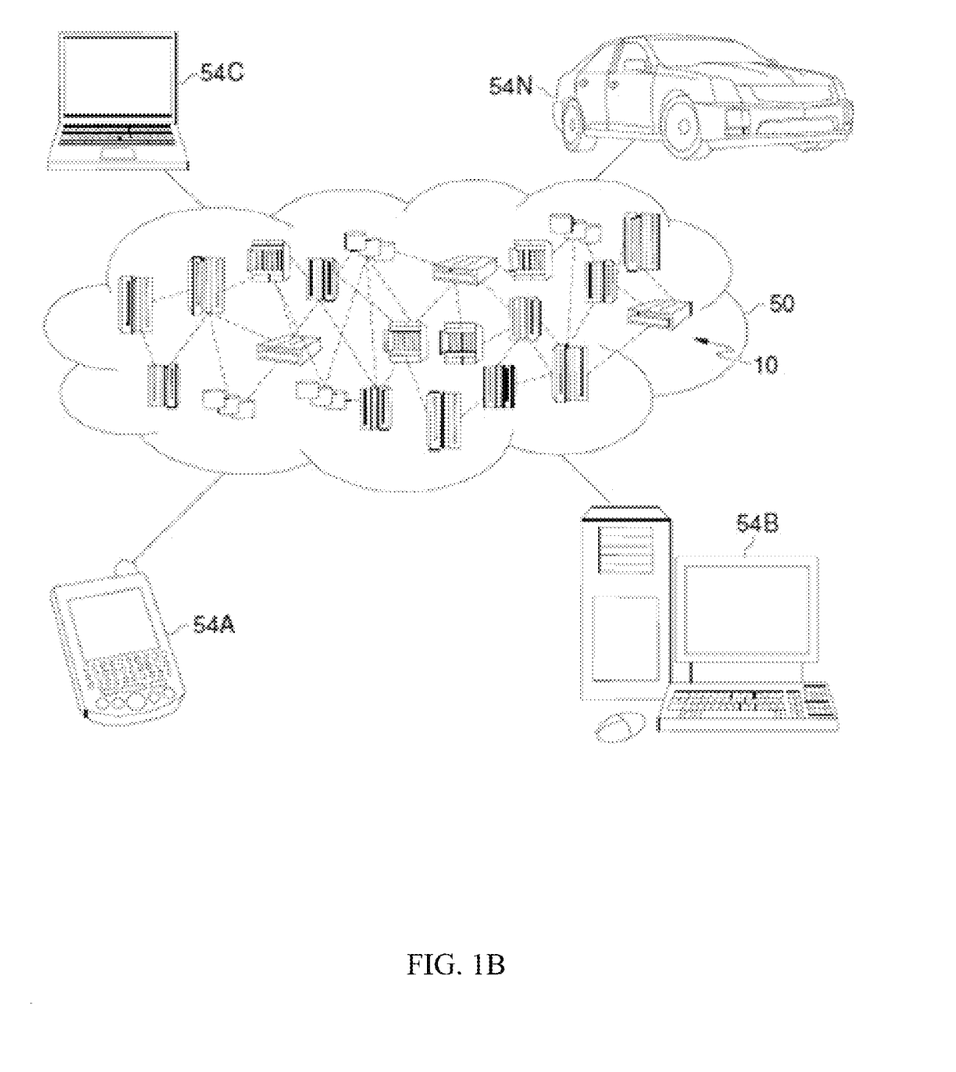
FIG. 1B depicts a cloud computing environment according to embodiments.

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 1C:
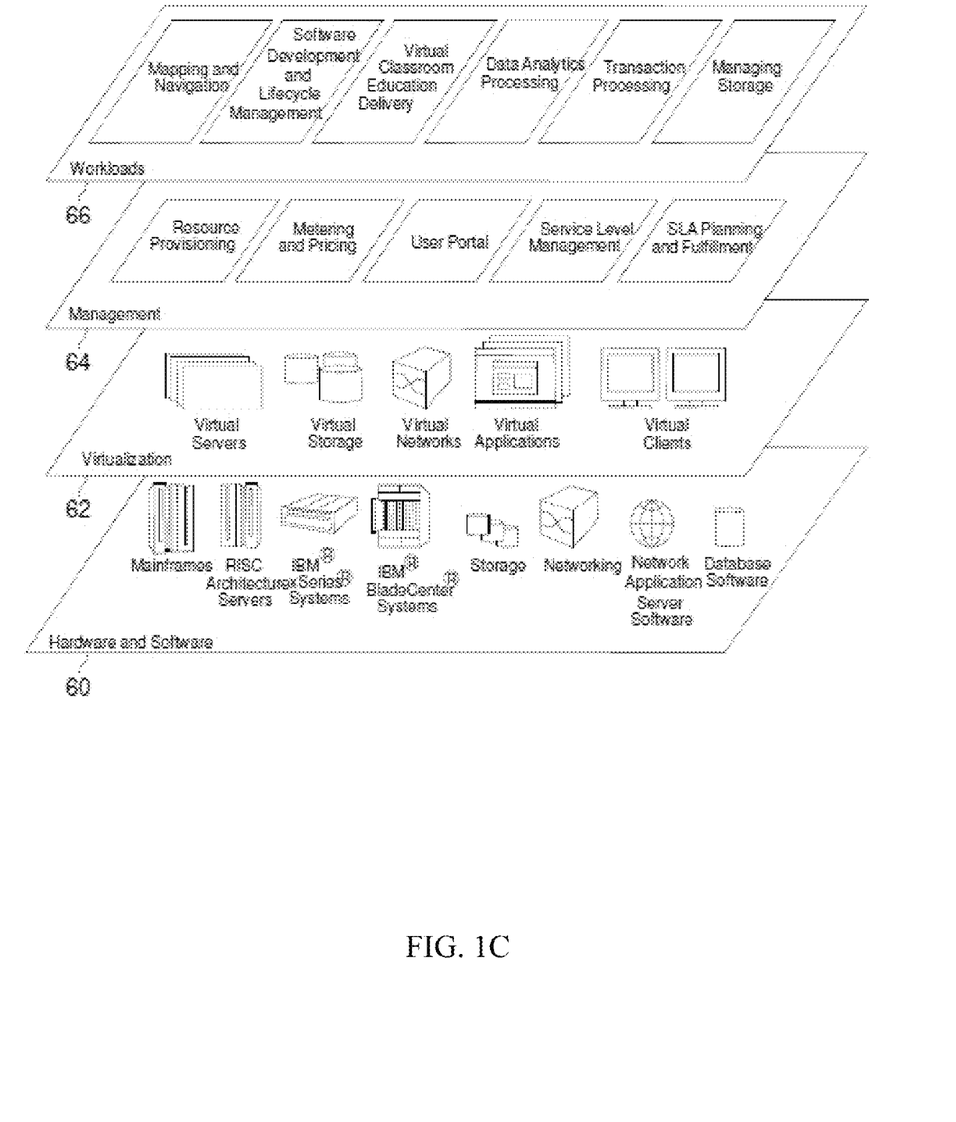
FIG. 1C depicts abstraction model layers according to embodiments.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing storage. Aspects of managing storage may positively impact management and control over application usage by a user or group. Managing storage may provide features to have object store quotas per user particularly associated with user/administrator approved/given workloads, provide features to have separate quotas for user-defined meta-data associated with objects per user particularly associated for user/administrator approved/given workloads, and provide features to generate future storage quota requirements for users per approved/given workloads.

Figure 2:
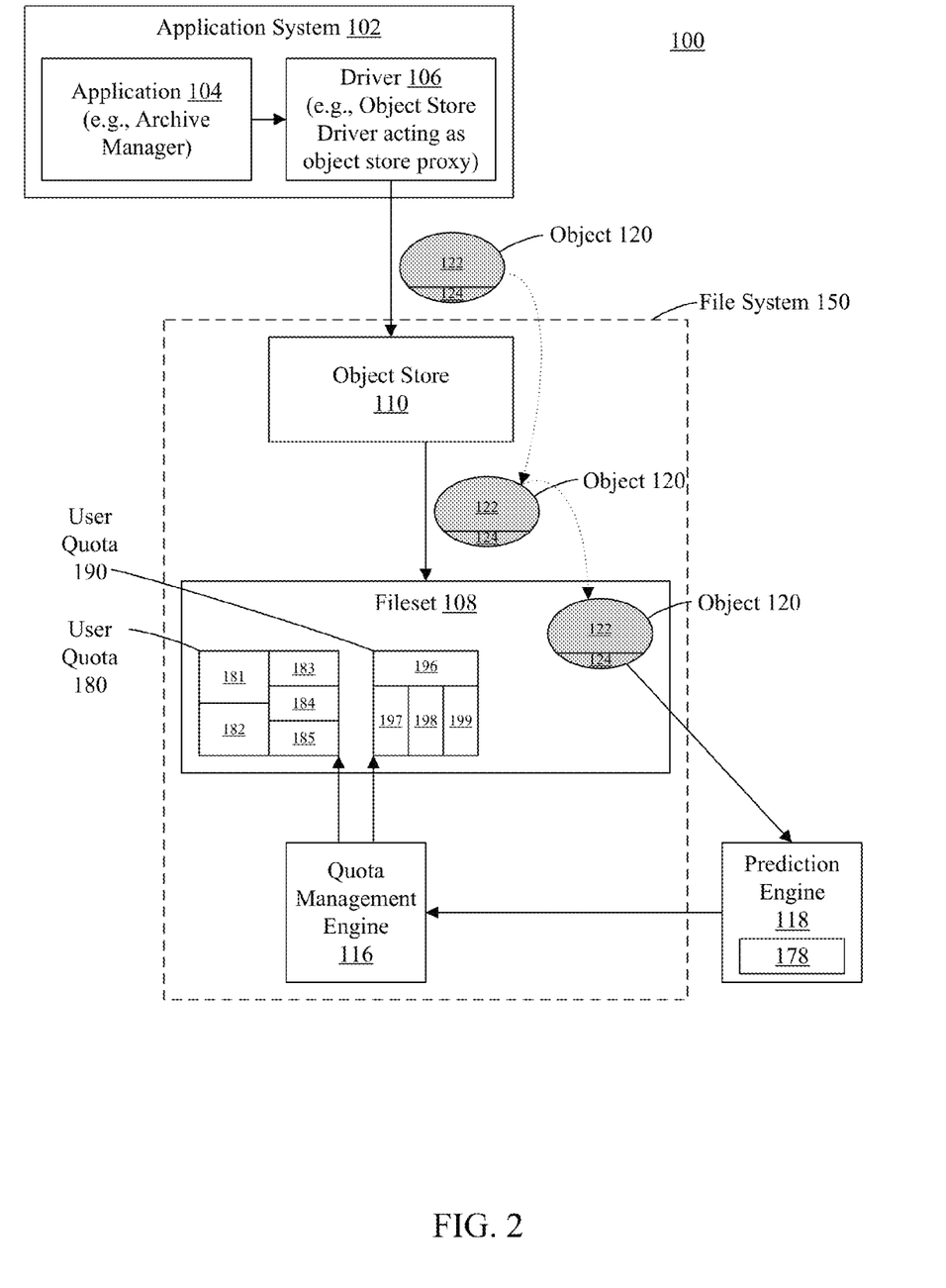
FIG. 2 depicts an example storage system according to embodiments.

FIG. 2 depicts an example storage system 100 according to embodiments. Application system 102 may include an application 104 and a driver 106. The application 104 may be an archive manager, for example. In embodiments, the driver 106 may be an object store driver. The object store driver may act as an object store proxy serving to identify workload-types for objects. Object 120 may be PUT by the application 104 for a given user on object store 110. Object 120 may have data 122 and meta-data 124 (the meta-data 124 may include descriptions of the workload associated with the object 120). The object store driver may tag objects to track usage by workload-type. For example, the object store driver can add workload tagging to every PUT request. As such, it may impose no change to the application 104 (other than configuring to speak with the object store proxy driver instead of an object store server).

File system 150 may include an object store 110, a fileset 108, and a quota management engine 116 (including quotas for user-defined meta-data). A prediction engine 118 may be associated with the file system 150. The prediction engine 118 may run a prediction algorithm based on a collection of historical data 178 (e.g., daily repository of workload information, user information, derivations from object meta-data). Fileset 108 may have user quotas 180 and 190. User quota 180 may be larger than user quota 190. The user quotas 180, 190 may have associated workload quotas 181, 182, 183, 184, 185, 196, 197, 198, and 199. Workload quotas 181, 182, 183, 184, 185 may be for a first user having user quota 180. Workload quotas 196, 197, 198, 199 may be for a second user having user quota 190. Workload quotas 181, 182 may be larger than workload quota 196 which may be larger than workload quotas 183, 184, 185, 197, 198, 199. A variety of possibilities are considered and the depiction merely provides an example.

Figure 3:
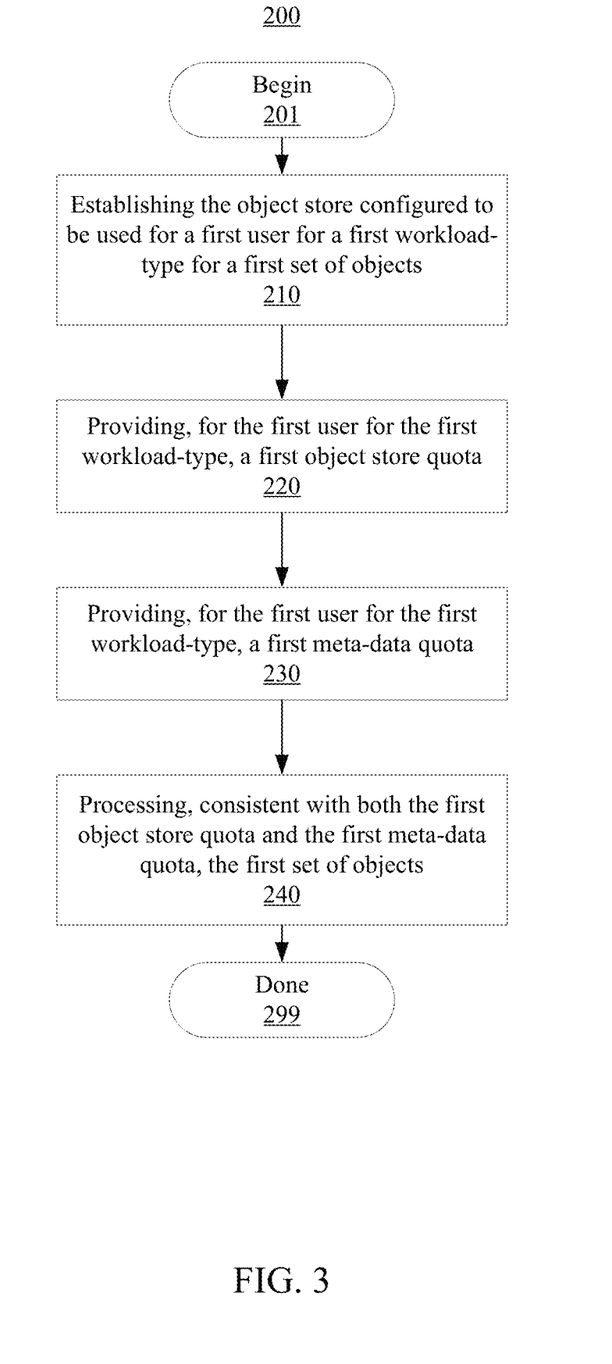
FIG. 3 is a flowchart illustrating a method for managing storage of an object for an object store according to embodiments.

FIG. 3 is a flowchart illustrating a method 200 for managing storage of an object for an object store according to embodiments. The method 200 begins at block 201, and may use a storage system such as the example storage system 100 in FIG. 2. In embodiments, the object may include a unique identifier (e.g., timestamp), data, or meta-data. The meta-data may include user-defined meta-data having a tag corresponding to something (e.g., an image, a video, an audio, characteristics such as flashing).

At block 210, the method 200 includes establishing the object store. The object store may be configured to be used for a first user for a first workload-type for a first set of objects. In embodiments, the object store may be configured to be used for a second user for the first workload-type for a second set of objects. In embodiments, the object store may be configured to be used for the first user for a second workload-type for a third set of objects. Along these lines, a plurality of users for a plurality of workload-types for a plurality of sets of objects is contemplated.

At block 220, the method 200 includes providing (e.g., assigning), for the first user for the first workload-type, a first object store quota (e.g., a value). In embodiments, a second object store quota may be provided for the second user for the first workload-type. In embodiments, a third object store quota may be provided for the first user for the second workload-type. Along these lines, a plurality of object store quotas for a plurality of users for a plurality of workload-types is contemplated.

At block 230, the method 200 includes providing (e.g., assigning), for the first user for the first workload-type, a first meta-data quota (e.g., a value). In embodiments, a second meta-data quota may be provided for the second user for the first workload-type. In embodiments, a third meta-data quota may be provided for the first user for the second workload-type. In embodiments, particular meta-data quota(s) may be for user-defined meta-data. In embodiments, particular meta-data quota(s) may be for application-defined meta-data. In embodiments, particular meta-data quota(s) may be based on utilization of particular workload-type(s) running on the object store. Similar to above, a plurality of meta-data quotas for a plurality of users for a plurality of workload-types is contemplated.

At block 240, the method 200 includes processing the first set of objects. Processing the first set of objects may occur consistent with both the first object store quota and the first meta-data quota. In embodiments, the second set of objects may be processed consistent with both the second object store quota and the second meta-data quota. In embodiments, the third set of objects may be processed consistent with both the third object store quota and the third meta-data quota. As such, multiple sets of objects may be processed consistent with a plurality of object store quotas and a plurality of meta-data quotas.

In embodiments a particular object store quota may be changed in response to a triggering event. Similarly, a particular meta-data quota may be changed in response to a triggering event. In embodiments, a future object store quota may be generated for a particular user for a particular workload-type. Similarly, a future meta-data quota may be generated for a particular user for a particular workload-type. The generations may be based at least in part on historical data. The method 200 concludes at block 299. To illustrate the method 200 and the example storage system 100, consider the detailed example described next according to embodiments.

Generally speaking, an object store quota per user for a given workload is provided for both overall data as well as meta-data (which can be tracked separately). First, application-defined meta-data may be associated with objects which define workload type. Object store can have enriched application-defined or user-defined meta-data, where the application storing data on the object store will be mandated to associate a predefined meta-data tag while storing the data called "workload_type." The application over the object store may involve integration development with the object store. The workload defining the meta-data "workload_type" definition may be part of this integration. For instance, if an archive manager is used to archive data on the object store, the archive manager may be mandated to associate a predefined application meta-data with the objects being stored (e.g. "workload_type:user_archive," "workload_type:user_dropbox"). This may mandate all objects associated with a workload stored on a fileset hosting an object store to have a predefined meta-data called "workload_type" associated with it. In embodiments, for applications that do not wish to be changed (or to accommodate a workload-based object store quota), there can be a small object store client/driver (which acts as a proxy) sitting with the application. In such case, the application can talk with the proxy and the combination can internally talk with the object store server, thereby passing the appropriate workload meta-data.

Next, application-defined user metadata called "workload_type" can assist to aggregate storage usage per workload by that user. Such information may help in imposing quotas over user(s) per workload for the meta-data quota, object store quota, or other quotas. Quota management in the file system or object store may be used to track and impose quota(s) separately on meta-data per user or group. In sum, the quota mechanism can support a quota on the object store based on workload-type per user/group for both data and metadata. The quota information can be stored in a table (e.g., with columns denoting which file system, which user, which workload, how much is the object store quota, how much is the meta-data quota, etc.). The user-defined meta-data quota can be separate or can be a subset of the overall storage quota. Relationships between different quotas can exist. For instance, proportionality between meta-data quotas and overall storage quotas for a specific workload-type may exist across a plurality of users. A quota enforcement engine can check on quota usage. The quota enforcement engine may check the workload-type and meta-data quota, for example. In embodiments, the workload-types may be approved by the storage administrator.

Subsequently, the information may be integrated into a user quota calculation to make a prediction for the user on a given object store for a given workload. A pattern of quota usage (including multiples different quotas) per workload per user may be recorded for a given time frame. A repository may be maintained to store historical data related to quota usage per workload per user/group. Such information can be stored in a database at regular intervals in a table. External events that might impact on the storage used by a given workload can be factored into the analysis. Ultimately, the data may be utilized with a prediction algorithm to predict the quota for a next time interval for a given workload per user.

The prediction algorithm may be based on Support Vector Machine (SVM) in combination with an arithmetic mean (to predict the object store quota in the next time interval). In embodiments, another tool may be used to predict the arithmetic mean based normalization of a training set. In embodiments, the combination may produce results for use. SVM includes a supervised learning model with associated learning algorithms that analyze data used for classification and regression analysis. The basic SVM can take a set of input data and can predict, for each given input, which of the possible classes forms the output. The prediction engine may be fed the training data set which can include past historical data about user/group quota usage for each workload-type. Based on this data, the engine may predict disk usage for next time cycle. In embodiments, a choice can be provided to an administrator to analyze the training data set and correct or eliminate anomalies (e.g., using defined thresholds for values in data sets).

Figure 4:
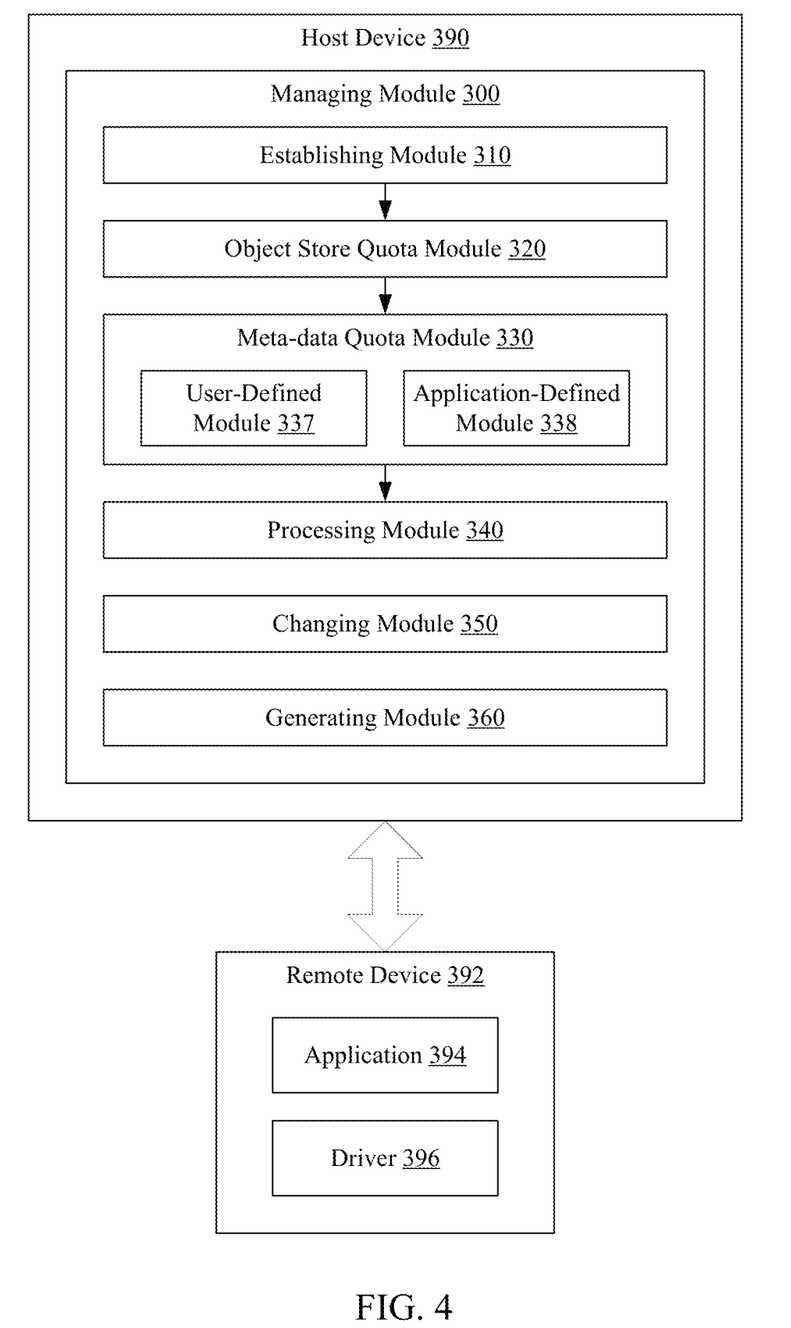
FIG. 4 shows modules of a system for managing storage of an object for an object store according to embodiments.

FIG. 4 shows modules of a system for managing storage of an object for an object store according to embodiments. In embodiments, method 200 may be implemented using one or more modules of FIG. 4. These modules may be implemented in hardware, software or firmware executable on hardware, or a combination thereof. For example, module functionality that may occur in a host device 390 may actually be implemented in a remote device 392 and vice versa. Other functionality may be distributed across the host device 390 and the remote device 392. Yet other functionality may be external to the host device 390 and the remote device 392, in embodiments.

The host device 390 may include a managing module 300. The managing module 300 may be configured and arranged to manage storage of an object for an object store. The managing module 300 may include an establishing module 310, an object store quota module 320, a meta-data quota module 330 having a user-defined module 337 and an application-defined module 338, a processing module 340, a changing module 350, and a generating module 360. The remote device 392 may have an application 394 and a driver 396 (any/all of which may be similar to aspects of FIG. 2).

The establishing module 310 may establish the object store and configured it to be used for a first user for a first workload-type for a first set of objects. In embodiments, an object (of a set of objects) may include a unique identifier, data, or meta-data. The meta-data may include user-defined meta-data having a tag corresponding to something (e.g., an image, a video, an audio, characteristics such as flashing). In embodiments, the object store may be configured to be used for a second user for the first workload-type for a second set of objects. In embodiments, the object store may be configured to be used for the first user for a second workload-type for a third set of objects. Along these lines, a plurality of users for a plurality of workload-types for a plurality of sets of objects is contemplated.

The object store quota module 320 may provide (e.g., assign), for the first user for the first workload-type, a first object store quota (e.g., a value). In embodiments, a second object store quota may be provided for the second user for the first workload-type. In embodiments, a third object store quota may be provided for the first user for the second workload-type. Along these lines, a plurality of object store quotas for a plurality of users for a plurality of workload-types is contemplated.

The meta-data quota module 330 may provide (e.g., assign), for the first user for the first workload-type, a first meta-data quota (e.g., a value). In embodiments, a second meta-data quota may be provided for the second user for the first workload-type. In embodiments, a third meta-data quota may be provided for the first user for the second workload-type. In embodiments, particular meta-data quota(s) may be for user-defined meta-data using the user-defined module 337. In embodiments, particular meta-data quota(s) may be for application-defined meta-data using the application-defined module 338. In embodiments, particular meta-data quota(s) may be based on utilization of particular workload-type(s) running on the object store. Similar to above, a plurality of meta-data quotas for a plurality of users for a plurality of workload-types is contemplated.

The processing module 340 may process the first set of objects. Processing the first set of objects may occur consistent with both the first object store quota and the first meta-data quota. In embodiments, the second set of objects may be processed consistent with both the second object store quota and the second meta-data quota. In embodiments, the third set of objects may be processed consistent with both the third object store quota and the third meta-data quota. As such, multiple sets of objects may be processed consistent with a plurality of object store quotas and a plurality of meta-data quotas.

In embodiments a particular object store quota may be changed in response to a triggering event using the changing module 350. Similarly, a particular meta-data quota may be changed in response to a triggering event. In embodiments, a future object store quota may be generated (e.g., predicted) for a particular user for a particular workload-type using the generating module 360. Similarly, a future meta-data quota may be generated for a particular user for a particular workload-type using the generating module 360. The generations may be based at least in part on historical data. The method 200 concludes at block 299. To illustrate the method 200 and the example storage system 100, consider the detailed example described next according to embodiments.

In sum, storage administrators may manage storage effectively with minimal wastage of disk space, which may positively impact disk space allocation (or over-allocation) and positively impact overall storage cost. Aspects of the disclosure provide features to have object store quotas per user particularly associated with user/administrator approved/given workloads, provide features to have separate quotas for user-defined meta-data associated with objects per user particularly associated for user/administrator approved/given workloads, and provide features to generate future storage quota requirements for users per approved/given workloads.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer-implemented method for managing storage of an object for an object store, the method comprising:
   establishing the object store configured to be used for a first user for a first workload-type for a first set of objects wherein the first workload type is data analytics processing;
   establishing the object store configured to be used for a second user for the first workload-type for a second set of objects;
   establishing the object store configured to be used for the first user for a second workload-type for a third set of objects;
   providing, for the first user for the first workload-type, a first object store quota;
   providing, for the second user for the first workload-type, a second object store quota;
   providing, for the first user for the second workload-type, a third object store quota;
   providing, for the first user for the first workload-type, a first meta-data quota, wherein the first meta-data quota limits the amount of space that may be used to store meta data related to the first workload type;
   providing, for the second user for the first workload-type, a second meta-data quota, wherein the second meta-data quota limits the amount of space that may be used to store meta data related to the first workload type;
   providing, for the first user for the second workload-type, a third meta-data quota, wherein the third meta-data quota limits the amount of space that may be used to store meta data related to the second workload type;
   processing, consistent with both the first object store quota and the first meta-data quota, the first set of objects;

processing, consistent with both the second object store quota and the second meta-data quota, the second set of objects;

processing, consistent with both the third object store quota and the third meta-data quota, the third set of objects;

changing, in response to a first triggering event the first object store quota;

changing, in response to a second triggering event the first meta-data quota; and generating, for the first user for the first workload-type, both a future object store quota and a future meta-data quota, the generation based at least in part on historical data.

2. The method of claim 1, wherein:

the first meta-data quota is for user-defined meta-data;

the second meta-data quota is for application-defined meta-data;

the third meta-data quota is based on utilization of the first workload-type running on the object store;

providing, for the first user for the first workload-type, the first object store quota includes assigning, for the first user for the first application, a first object store quota value;

providing, for the first user for the first workload-type, the first meta-data quota includes assigning, for the first user for the first application, a first meta-data quota value; and the object includes a unique identifier, data, and meta-data including user-defined meta-data having a tag corresponding to an image.

3. A system comprising:

a processor; and a memory in communication with the processor, the memory containing program instructions that, when executed by the processor, are configured to cause the processor to perform a method comprising:

establishing the object store configured to be used for a first user for a first workload-type for a first set of objects wherein the first workload type is data analytics processing;

establishing the object store configured to be used for a second user for the first workload-type for a second set of objects;

establishing the object store configured to be used for the first user for a second workload-type for a third set of objects;

providing, for the first user for the first workload-type, a first object store quota;

providing, for the second user for the first workload-type, a second object store quota;

providing, for the first user for the second workload-type, a third object store quota;

providing, for the first user for the first workload-type, a first meta-data quota, wherein the first meta-data quota limits the amount of space that may be used to store meta data related to the first workload type;

providing, for the second user for the first workload-type, a second meta-data quota, wherein the second meta-data quota limits the amount of space that may be used to store meta data related to the first workload type;

providing, for the first user for the second workload-type, a third meta-data quota, wherein the third meta-data quota limits the amount of space that may be used to store meta data related to the second workload type;

processing, consistent with both the first object store quota and the first meta-data quota, the first set of objects;

processing, consistent with both the second object store quota and the second meta-data quota, the second set of objects;

processing, consistent with both the third object store quota and the third meta-data quota, the third set of objects;

changing, in response to a first triggering event the first object store quota;

changing, in response to a second triggering event the first meta-data quota; and generating, for the first user for the first workload-type, both a future object store quota and a future meta-data quota, the generation based at least in part on historical data.

4. The system of claim 3, wherein:

the first meta-data quota is for user-defined meta-data;

the second meta-data quota is for application-defined meta-data;

the third meta-data quota is based on utilization of the first workload-type running on the object store;

providing, for the first user for the first workload-type, the first object store quota includes assigning, for the first user for the first application, a first object store quota value;

providing, for the first user for the first workload-type, the first meta-data quota includes assigning, for the first user for the first application, a first meta-data quota value; and the object includes a unique identifier, data, and meta-data including user-defined meta-data having a tag corresponding to an image.

5. A computer program product, the computer program product comprising a computer readable storage medium having program instructions embodied therewith, the program instructions executable by a computer to cause the computer to:

establish the object store configured to be used for a first user for a first workload-type for a first set of objects wherein the first workload type is data analytics processing;

establish the object store configured to be used for a second user for the first workload-type for a second set of objects;

establish the object store configured to be used for the first user for a second workload-type for a third set of objects;

provide, for the first user for the first workload-type, a first object store quota;

provide, for the second user for the first workload-type, a second object store quota;

provide, for the first user for the second workload-type, a third object store quota;

provide, for the first user for the first workload-type, a first meta-data quota, wherein the first meta-data quota limits the amount of space that may be used to store meta data related to the first workload type;

provide, for the second user for the first workload-type, a second meta-data quota, wherein the second meta-data quota limits the amount of space that may be used to store meta data related to the first workload type;

provide, for the first user for the second workload-type, a third meta-data quota, wherein the third meta-data quota limits the amount of space that may be used to store meta data related to the second workload type;

process, consistent with both the first object store quota and the first meta-data quota, the first set of objects;

process, consistent with both the second object store quota and the second meta-data quota, the second set of objects;

process, consistent with both the third object store quota and the third meta-data quota, the third set of objects;

change, in response to a first triggering event the first object store quota;

change, in response to a second triggering event the first meta-data quota; and generate, for the first user for the first workload-type, both a future object store quota and a future meta-data quota, the generation based at least in part on historical data.

6. The computer program product of claim 5, wherein:

the first meta-data quota is for user-defined meta-data;

the second meta-data quota is for application-defined meta-data;

the third meta-data quota is based on utilization of the first workload-type running on the object store;

providing, for the first user for the first workload-type, the first object store quota includes assigning, for the first user for the first application, a first object store quota value;

providing, for the first user for the first workload-type, the first meta-data quota includes assigning, for the first user for the first application, a first meta-data quota value; and the object includes a unique identifier, data, and meta-data including user-defined meta-data having a tag corresponding to an image.

* * * * *